Figure 2:
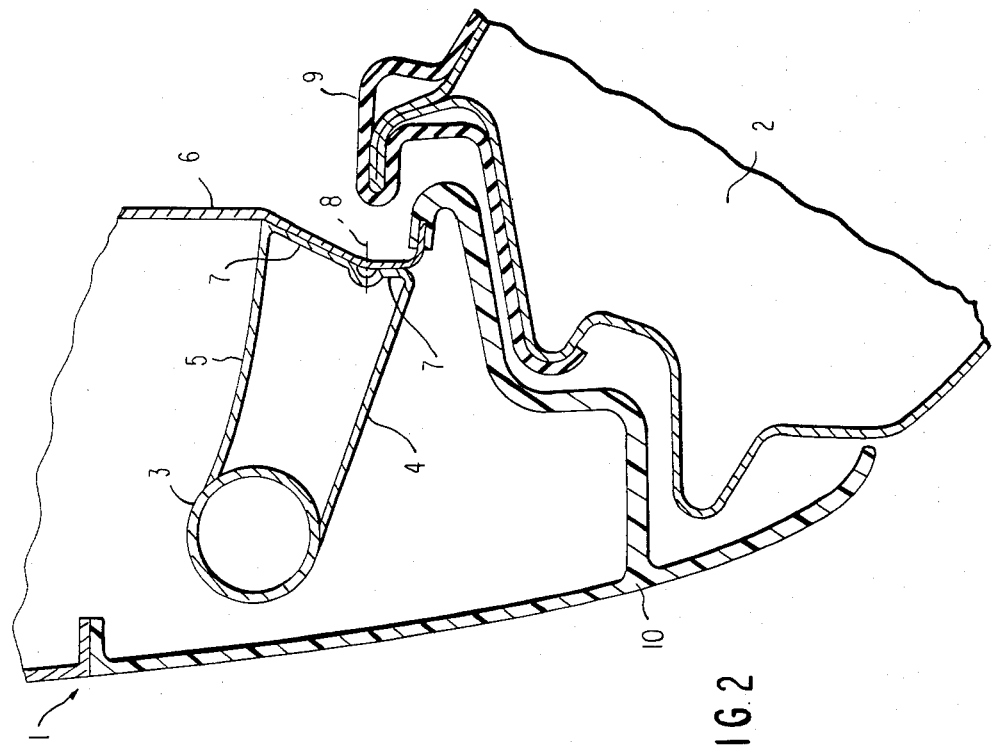

United States Patent [19]

Kling

[11] Patent Number: 4,488,751
[45] Date of Patent: Dec. 18, 1984

[54] LATERAL PROTECTION FOR MOTOR VEHICLES

[75] Inventor: Günter Kling, Böblingen, Fed. Rep. of Germany

[73] Assignee: Daimler-Benz AG, Fed. Rep. of Germany

[21] Appl. No.: 451,813

[22] Filed: Dec. 21, 1982

[30] Foreign Application Priority Data

Dec. 30, 1981 [DE] Fed. Rep. of Germany ....... 3151861

[51] Int. Cl.³ .................................................. B60J 5/04
[52] U.S. Cl. ....................................... 296/146; 49/502
[58] Field of Search .................... 296/146, 188; 49/502

[56] References Cited

U.S. PATENT DOCUMENTS

| | | | |
|---|---|---|---|
| 3,782,036 | 1/1974 | Clark | 49/502 |
| 3,808,743 | 5/1974 | Renner | 49/502 |
| 3,829,149 | 8/1974 | Stevens | 296/189 |
| 3,874,119 | 4/1975 | Renner et al. | 49/502 |
| 3,907,358 | 9/1975 | Barenyi | 296/146 |
| 3,938,288 | 2/1976 | Roubinet | 296/146 |
| 3,964,208 | 6/1976 | Renner | 49/502 |
| 4,090,734 | 5/1978 | Inami | 296/146 |
| 4,307,911 | 12/1981 | Paulik | 296/146 |

*Primary Examiner*—Robert R. Song
*Attorney, Agent, or Firm*—Craig & Burns

[57] ABSTRACT

An assembly providing lateral protection for motor vehicles, in which at least one reinforcement, extending essentially in the vehicle longitudinal direction and preferably constructed as hollow bearer, is arranged inside of each of the doors and the lower area of the doors is constructed so as to form-lockingly engage with the door threshold bearers. The reinforcement is so arranged that the orientation of a force flow starting from the reinforcement takes place, in case of a lateral impact in the direction toward the door threshold bearer so that the latter is utilized for the dissipation of impact energy, and particularly when the lateral impact takes place above the same.

8 Claims, 2 Drawing Figures

LATERAL PROTECTION FOR MOTOR VEHICLES

The present invention relates to an assembly providing lateral protection for motor vehicles, in which at least one reinforcement, preferably constructed as hollow bearer and extending essentially in the vehicle longitudinal direction, is arranged inside of each of the doors and in which the lower area of the doors is constructed to engage form-lockingly behind the door threshold bearers.

It is already known from the German Offenlegungsschrift No. 23 19 124 to equip the doors of a motor vehicle with reinforcements constructed as hollow bearers and to secure an angle member in the lower area of the doors which engages behind a sheet metal member projecting from the outer vehicle longitudinal bearers.

The aim of this prior art arrangement resides in absorbing by tensional forces impact loads on the yielding door zones between the reinforcement and door lower edge by an interengagement of the door and longitudinal bearer.

However, this interengagement remains effective only with small deformations since the tensional forces may lead to the bending open of the interengagement and additionally the tensional forces which can be absorbed by the thin door panels are very limited.

The present invention is therefore concerned with the arranging a reinforcement inside the doors wherein the interengagement of the door lower edge and door threshold bearer is preserved even in case of larger deformations.

The underlying problems are solved according to the present invention in that the reinforcement is so arranged that the orientation of a force flow which starts from the reinforcement, in case of a lateral impact, preferably takes place in the direction of the door threshold bearer.

A particular advantage of the present invention resides in that in case of lateral collisions at the critical "bumper height", i.e., above the door threshold bearer, the door threshold bearer which by reason of its bearing function is very torsion-resistant, can be utilized to a considerable extent for the absorption of impact energy.

This is of particular significance in view of the requirement for a light-weight construction with preservation of the passive safety.

If the reinforcement is formed by a cylindrical pipe and the pipe is supported at an interior door panel by at least two web members of different bending-resistance and if the interior door panel has an intentional bending line between the support points of the web members, then a construction providing lateral protection for motor vehicles can be realized which assures a defined transmission of the force flow notwithstanding simple constructive means.

According to another feature of the present invention, an outer lower door part may be constructed of elastic plastic material without impairing the effect of the reinforcement.

Figure 1:
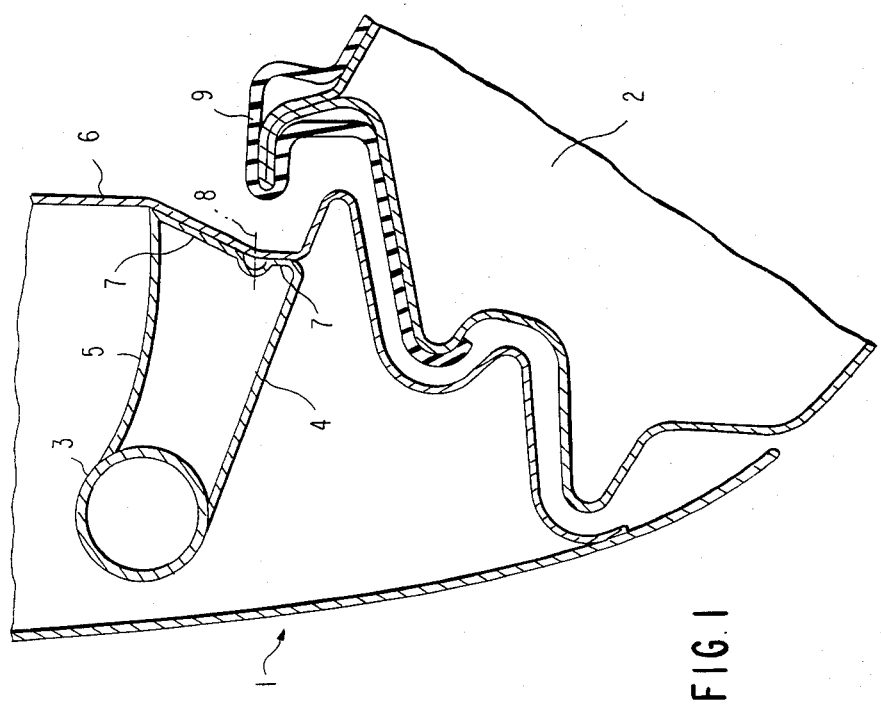

These and other objects, features and advantages of the present invention will become more apparent from the following description when taken in connection with the accompanying drawing which shows, for purposes of illustration only, two embodiments in accordance with the present invention and wherein:

FIG. 1 is a partial cross-sectional view through the lower section of a door equipped with a reinforcement according to the present invention together with a pair of the door threshold bearer which is form-lockingly engaged from behind; and FIG. 2 is a cross-sectional view, similar to FIG. 1, with an outer lower door part made of synthetic plastic material.

Referring now to the drawing wherein like reference numerals are used throughout the two views to designate like parts, and more particularly to FIG. 1, the position of the door generally designated by reference numeral 1 of a motor vehicle (not shown) in relation to the door threshold bearer 2 can be readily recognized from this figure.

A cylindrical tubular member 3 extending in the longitudinal direction of the vehicle is arranged inside of the door 1 at a distance from the outer panel.

This tubular member or pipe 3 is rigidly connected with the inner door panel 6 by way of a lower straight sheet-metal web member 4 and by way of an upper sheet metal web member 5 which is bent toward the lower sheet metal web member 4.

The interior door panel 6 has a curvature directed toward the pipe 3 between the fastening points of the upper and lower sheet metal web members 4 and 5 and is provided on the inside with a bending-resistant reinforcement 7 which determines an intentional bending line 8. Below the sheet-metal web members 4 and 5, the interior door panel 6 is formed so as to be matched or complementary to the grooves, i.e., contour, of the door threshold bearer 2.

The upper edge of the door threshold bearer 2 is surrounded with a profile 9 that has pommel-shape cross section.

In FIG. 2, this lower door area is illustrated with an outer lower door part 10 consisting of elastic plastic material.

OPERATION

A lateral impact at the height of the tubular member 3 would have the following consequences:

The impact on the tubular member 3 would be transmitted by way of the sheet-metal webs 4 and 5 onto the interior door panel 6 until the latter abuts with the intentional bending line 8 at the profile 9. A greater resistance is now opposed to deformation in a manner wherein the interior door panel 6 bends about the intentional bending line 8 and securely surrounds the upper part of the door threshold bearer 2. After the interengagement has thus taken place, the lower and upper sheet-metal webs 4 and 5 are deformed.

The lower sheet metal web 4 thereby conducts considerable energy into the door threshold bearer 2 and as a result thereof assures simultaneously the preservation of the interengagement.

As a result of this active introduction of deformation energy into the door threshold bearer 2, lateral protection is assured also in case of greater collisions.

While I have shown and described two embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An assembly providing lateral protection for motor vehicles having doors, with lower portions configured to be generally complementary to door threshold bearer portions of the motor vehicle, comprising means disposed inside of each vehicle door extending generally in the longitudinal direction of the vehicle for reinforcement, said means including a hollow bearer and a plurality of web plate means having different bending-resistances for supporting said hollow bearer relative to an inner door panel of the respective door, said means for reinforcing disposed in a manner directing the force flow originating therefrom, in the event of a lateral impact, in the direction of the threshold bearer portion.

2. The assembly according to claim 1, wherein the hollow bearer is generally tubular.

3. The assembly according to claim 2, wherein the tubular hollow bearer is generally cylindrical.

4. The assembly according to claim 2, wherein the plurality of web plate means supporting the tubular hollow bearer to the inner door panel includes two sheet metal web members each having different bending-resistance.

5. The assembly according to claim 4, wherein the inner panel of the door has an intentional bending line intermediate points of support of the two web members.

6. The assembly according to claim 5, wherein an outer lower part of each respective door is made of plastic material.

7. The assembly according to claim 1, wherein an outer lower part of each respective door is made of plastic material.

8. The assembly according to claim 1, wherein the inner panel of each respective door has an intentional bending line intermediate points of support of the two web members.

* * * * *